United States Patent
Baba et al.

(10) Patent No.: US 6,461,511 B1
(45) Date of Patent: Oct. 8, 2002

(54) APPARATUS AND METHOD FOR WASTE WATER TREATMENT

(75) Inventors: Yasuhiro Baba, Okayama; Hiroaki Fujii; Tadao Shiotani, both of Osaka; Kiichirou Oka, Okayama; Tsutomu Miura, Kurashiki, all of (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 09/714,229

(22) Filed: Nov. 17, 2000

(30) Foreign Application Priority Data

Nov. 19, 1999 (JP) .......................................... 11-330167

(51) Int. Cl.⁷ ............................... C02F 3/08; C02F 3/02
(52) U.S. Cl. ...................... 210/616; 210/620; 210/650; 210/151; 210/259; 435/180
(58) Field of Search ................... 210/615–618, 210/620, 621, 623, 625, 626, 636, 650, 150, 151, 252, 259, 263, 321.69, 321.76, 321.85; 435/174, 177, 180, 182

(56) References Cited

U.S. PATENT DOCUMENTS

| | | | |
|---|---|---|---|
| 3,402,125 A | * | 9/1968 | Tanaka |
| 3,468,795 A | * | 9/1969 | Bye-Jorgenson et al. |
| 3,472,765 A | * | 10/1969 | Budd et al. |
| 4,566,971 A | * | 1/1986 | Reimann et al. |
| 5,230,803 A | * | 7/1993 | Thuer et al. |
| 5,558,774 A | * | 9/1996 | Tonelli et al. |
| 5,788,841 A | * | 8/1998 | Dickerson |
| 5,932,099 A | * | 8/1999 | Cote et al. |
| 5,997,736 A | * | 12/1999 | Tanaka et al. |
| 6,007,712 A | * | 12/1999 | Tanaka et al. |
| 6,027,649 A | * | 2/2000 | Benedek et al. |
| 6,113,792 A | * | 9/2000 | Benjamin et al. |
| 6,207,209 B1 | * | 3/2001 | Jirjis et al. |

FOREIGN PATENT DOCUMENTS

| | | | |
|---|---|---|---|
| JP | 6-47399 | * | 2/1994 |
| JP | 9-57289 | * | 3/1997 |

* cited by examiner

Primary Examiner—David A. Simmons
Assistant Examiner—Fred Prince
(74) Attorney, Agent, or Firm—Oblon, Spivak, McClelland, Maier & Neustadt, P.C.

(57) ABSTRACT

Provided are an apparatus and a method for waste water treatment not generating excessive sludge, for which down-sized tanks are usable. The apparatus comprises an aeration tank where waste water to be treated is kept in contact with carrier particles in an aerobic condition, and a complete oxidation tank. In this, the liquid in the complete oxidation tank is filtered through a separation membrane and the resulting filtrate is discharged out of the system. The s-BOD sludge load to the complete oxidation tank is preferably at most 0.1 kg-BOD/kg-MLSS·day.

10 Claims, 1 Drawing Sheet

APPARATUS AND METHOD FOR WASTE WATER TREATMENT

BACKGROUND OF THE INVENTION

1. Field of the Invention

The present invention relates to an apparatus and a method for waste water treatment not generating excessive sludge.

2. Description of the Related Art

Heretofore, an activated sludge process has been employed generally for waste water treatment. In the process, the activated sludge is flocculated in a flocculation tank, while a part of the floc is returned to an aeration tank and the remaining part thereof, excessive sludge is drawn out of the system. With that, the process line can be constantly run under the condition of a BOD volume load falling between 0.3 and 0.8 kg/m$^3$.day or so. On the other hand, carriers capable of carrying a high concentration of microorganisms are being developed for the process, and they enable a higher BOD volume load falling between 2 and 5 kg/m$^3$.day applicable to the process line, and will realize down-sized aeration tanks for the process.

One problem with the conventional activated sludge process is that the BOD volume load to the process line is limited to the range falling between 0.3 and 0.8 kg/m$^3$.day or so. In the process, therefore, large-size aeration tanks are inevitable. Another problem with it is that the excessive sludge must be drawn out of the system and must be treated in an additional line. In the activated sludge process, if waste water is treated under an elevated BOD volume load, its treatment is often insufficient. If so, in addition, the activated sludge will poorly flocculate and, as a result, continuously running the process line will be impossible. On the other hand, if complete oxidation is tried in the activated sludge tank without the excessive sludge being drawn out of the system, for which the sludge propagation rate shall be in proportion to the sludge self-oxidation rate, MLSS in the aeration tank will increase to a great extent, and, as a result, an extremely large-size activated sludge tank is inevitable in the process line. However, such a large-size tank is unfavorable. In addition, in such a case, the sludge will form fine particles and produces another problem in that it could not be separated from the treated water through spontaneous flocculation.

Compared with the activated sludge process, a process of water treatment with a carrier (this is hereinafter referred to as a carrier process) is advantageous in that a higher load is applicable to the process line and that down-sized aeration tanks are usable therein. In the carrier process, however, fine sludge particles that could not be separated from the treated water through spontaneous flocculation are formed, and they must be separated from it through forced flocculation with a flocculant. Therefore, the problem with the carrier process is that it requires an additional cost for the flocculant and that the floc must be further treated in an additional line.

SUMMARY OF THE INVENTION

The present invention has been made in consideration of the above-mentioned problems, and its object is to provide an apparatus and a method for waste water treatment which accept down-sized tanks for use therein not generating excessive sludge.

The apparatus for waste water treatment of the invention that solves the above-mentioned problems comprises an aeration tank where waste water is kept in contact with carrier particles in an aerobic condition, and a complete oxidation tank, and is characterized in that the liquid in the complete oxidation tank is filtered through a separation membrane and the resulting filtrate is discharged out.

In the complete oxidation tank, the waste water being treated is aerated under a low sludge load with the sludge propagation rate being kept in proportion to the sludge self-oxidation rate to thereby prevent the sludge increase. For this, the s-BOD sludge lo-ad in the complete oxidation tank is preferably at most 0.1 kg-BOD/kg-MLSS.day, more preferably at most 0.05 kg-BOD/kg-MLSS.day. In case where an ordinary activated sludge process line is run under such a low sludge load, the sludge therein will disperse and could not spontaneously flocculate, thereby producing a problem in that the sludge is difficult to separate from the treated water. Therefore, the waste water treatment apparatus of the invention is combined with a separation membrane through which the solid component (sludge) is separated from the treated water (filtered water). With that, it is possible to continuously run the waste water treatment apparatus of the invention not generating excessive sludge. As so mentioned hereinabove, in case where complete oxidation is tried in an ordinary activated sludge process, an extremely large-size activated sludge tank must be provided in the process line. Being different from such an ordinary activated sludge process, the waste water treatment apparatus of the invention is for a carrier process, in which, therefore, the aeration tank may be a compact one. In addition, since the majority of BOD can be removed from waste water in the aeration tank therein, the apparatus of the invention does not require a large-size complete oxidation tank. Even when the concentration of the activated sludge is low in a compact-size complete oxidation tank in the apparatus of the invention, the sludge propagation rate can be well kept in proportion to the sludge self-oxidation rate, and the apparatus does not require excessive sludge removal.

DESCRIPTION OF THE PREFERRED EMBODIMENTS

Figure 1:
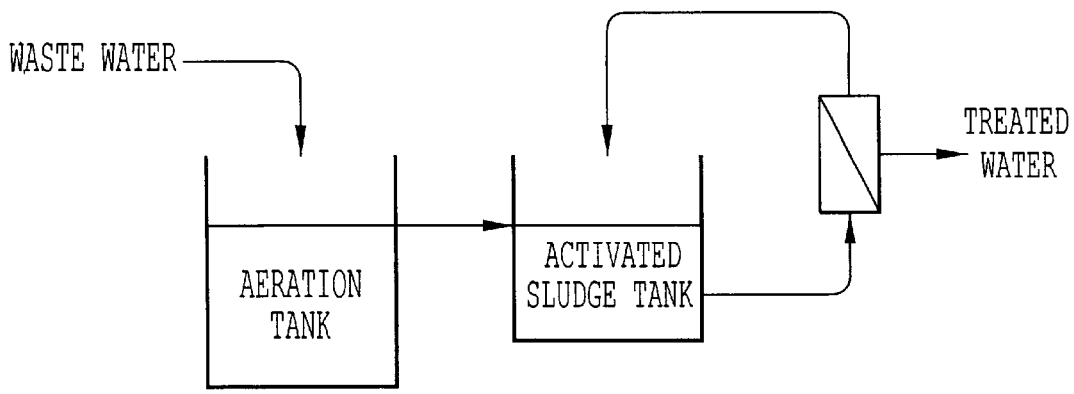
FIG. 1 is a schematic flowchart of one embodiment of the invention.

One embodiment of the flowchart of the waste water treatment apparatus of the invention is shown in FIG. 1. In the illustrated system, the aeration tank is down-sized as much as possible, to which the soluble-BOD volume load is preferably at least 1 kg/m$^3$.day. The soluble-BOD is meant to indicate BOD measured after filtration through a 0.45$\mu$-filter, and this contains no microorganisms (this is herein referred to as "s-BOD"). With the increase in the s-BOD volume load to be applied thereto, the size of the aeration tank can be reduced to a greater degree. Depending on the type and the amount of the carrier to be in the aeration tank, it is possible to run the apparatus under a soluble-BOD volume load of 2 kg/m$^3$.day or more, or even under 5 kg/m$^3$.day or more.

The shape of the separation membrane for use in the invention is not specifically defined, including, for example, hollow fiber membranes, tubular membranes, sheet membranes, etc. Hollow fiber membranes are preferred, as the membrane area per the unit volume can be enlarged and the overall size of the filtration unit comprising the membrane can be reduced.

The material for the separation membrane is not also specifically defined. For example, organic polymer membranes of polyolefins, polysulfones, polyether sulfones, ethylene-vinyl alcohol copolymers, polyacrylonitriles, cellulose acetates, polyvinylidene fluorides, polyperfluoroethylenes, polymethacrylates, polyesters, polyamides or the like, as well as inorganic membranes of ceramics or the like may be used herein, appropriately selected depending on the condition for their use and on the desired filtration performance. Hydrophilic membranes of polysulfone resins hydrophilicated with polyvinyl alcohol resins, polysulfone resins with hydrophilic polymers added thereto, polyvinyl alcohol resins, polyacrylonitrile resins, cellulose acetate resins or hydrophilicated polyethylene resins are preferred. This is because, since the resin membranes have a high degree of hydrophilicity, SS components are difficult to adhere onto them and, even when having adhered onto them, the adhered SS components are readily peeled off from them. Not limited to such hydrophilic membranes, any other hollow fiber membranes of other materials are also usable herein. For organic polymer membranes for use in the invention, a plurality of components may be copolymerized, or a plurality of materials may be blended.

The pore size of the separation membrane for use in the invention is preferably at most 1 micron in view of the capability of the membrane to separate sludge from water. More preferably, the pore size is at most 0.5 microns, as ensuring higher water permeability through the membrane not causing pore clogging that lowers the filtration efficiency of the membrane. Even more preferably, the pore size is at most 0.1 microns. The pore size referred to herein corresponds to the particle size of standard substances, such as colloidal silica, emulsion or latex, capable of being separated by the membrane. Briefly, a liquid sample containing a standard substance having a known particle size is filtered through the separation membrane. When 90% of the standard substance is separated by the membrane, the pore size of the membrane corresponds to the particle size of the standard substance. Preferably, the separation membrane have a uniform pore size. The pore size of an ultrafiltration membrane cannot be obtained in the manner as above based on the particle size of a standard substance. To measure the pore size of an ultrafiltration membrane, a protein having a known molecular weight may be used. Ultrafiltration membranes capable of fractionating proteins having a molecular weight of at least 3000 are preferred for use in the invention.

Figure 2:
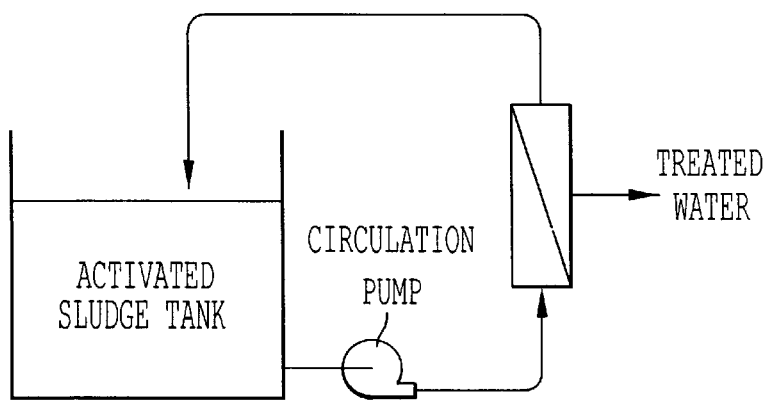
FIG. 2 shows one embodiment of separation membrane disposition.
Figure 3:
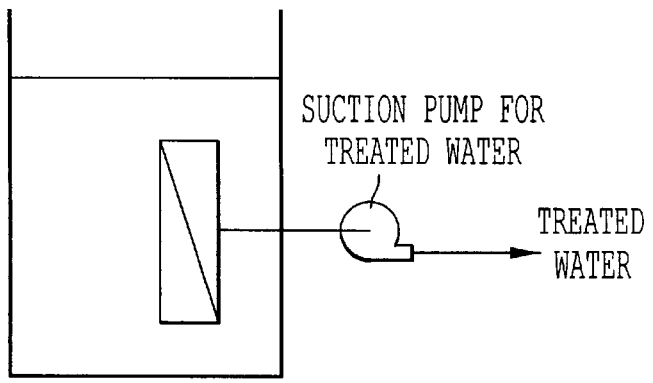
FIG. 3 shows another embodiment of separation membrane disposition.

Embodiments of disposition and constitution of the separation membrane and the membrane filtration unit for use in the invention are shown in FIG. 2 and FIG. 3. Two filtration systems employable herein are illustrated. One is as in FIG. 2, in which the membrane module containing a filtration membrane is disposed outside the complete oxidation tank. In this embodiment, waste water containing sludge is circulated while a part of it is filtered through the separation membrane. Another is as in FIG. 3, in which the membrane module containing a separation membrane is disposed inside the complete oxidation tank, and waste water is filtered under suction through the separation membrane. The filtration system may be appropriately selected for use in the invention, depending on the shape and the characteristic of the separation membrane used and on the disposition space for the membrane module. The system of FIG. 2 is advantageous in that it can be operated at a high permeation flow rate through the membrane module and that the membrane area can be reduced, but is disadvantageous in that the energy for circulating the sludge-containing waste water through the system shall be large. On the other hand, the system of FIG. 3 is advantageous in that the disposition space and the energy for it may be small, but is disadvantageous in that the permeation flow rate through the membrane module could not be high and that the system requires a large membrane area. In the system of FIG. 3 where the membrane module containing the separation membrane is inside the complete oxidation tank, the membrane module may be disposed above a degassing unit. One advantage of this disposition is that the membrane surface can be washed with gas bubbles from the degassing unit and is prevented from being clogged. For carrying out the invention, new facilities for waste water treatment may be constructed, or existing facilities for waste water treatment may be reformed.

Any known carriers may be used in the invention. At least one selected from gel-like carriers, plastic carriers and fibrous carriers, or a combination of two or more of them is preferred for use in the invention. Above all, especially preferred are acetalized polyvinyl alcohol gel carriers in view of their processing ability and fluidity. The amount of the carrier to be in the aeration tank preferably falls between 5% and 50%, more preferably between 10% and 30% of the tank volume.

EXAMPLE

The invention is described in more detail with reference to the following Example, which, however, is not intended to restrict the scope of the invention.

Example

A pilot plant for waste water treatment was prepared for carrying out the invention, comprising a 20 $m^3$ waste water tank, a 20 $m^3$ carrier-fluidized aeration tank, and a 40 $m^3$ complete oxidation tank. 2 $m^3$ of an acetalized polyvinyl alcohol gel carrier (having a particle diameter of about 4 mm) was put into the aeration tank. A filtration membrane unit comprising two hollow fiber membrane modules of polysulfone resin (membrane area: 20 $m^2$) was disposed outside the complete oxidation tank. Waste water was treated in this pilot plant driven in an internal-pressure circulated filtration system at a filtration rate of 20 $m^3$/day. With the water having passed through the separation membrane being discharged out of the complete oxidation tank, the sludge was concentrated and circulated in the system. The flowchart of the pilot plant in this Example 1 is as in FIG. 1. Based on the invention, the BOD volume load to the carrier-fluidized aeration tank was 3.5 kg/$m^3$.day. While the plant was driven under the condition, MLSS in the complete oxidation tank gradually increased, but when the s-BOD sludge load reached 0.05 kg-BOD/kg-MLSS, MLSS in the tank was about 7000 mg/liter and was almost constant. In this stage, BOD in the treated water was at most 10 mg/liter, and SS therein was zero. The sludge was not drawn out of the system, and continuously running the plant was possible.

In the present invention, down-sized tanks are usable for waste water treatment, not generating excessive sludge.

While the invention has been described in detail and with reference to specific embodiments thereof, it will be apparent to one skilled in the art that various changes and modifications can be made therein without departing from the spirit and scope thereof.

What is claimed is:

1. An apparatus for waste water treatment in a carrier process, which comprises:

an aeration tank wherein waste water is contacted with carrier particles under aerobic conditions;

a complete oxidation tank in which sludge is oxidized; and a separation membrane, associated with the complete oxidation tank, through which the sludge in the complete oxidation tank is filtered and the resulting aqueous filtrate obtained is discharged from the apparatus.

2. The apparatus of claim 1, wherein said carrier is at least one material selected from the group consisting of gel carriers, plastic carriers and fibrous carriers.

3. The apparatus of claim 2, wherein the carrier is an acetylized polyvinyl alcohol gel.

4. The apparatus of claim 1, wherein the pore size of the separation membrane is at most 1 µm.

5. The apparatus of claim 4, wherein the separation membrane is a hollow fiber membrane.

6. The apparatus of claim 7, wherein the separation membrane is an organic polymer membrane prepared from a polymeric material selected from the group consisting of polyolefins, polysulfones, polyether sulfones, ethylene-vinyl alcohol copolymers, polyacrylonitriles, cellulose acetates, polyvinylidene fluorides, polyperfluoroethylenes, polymethacrylates, polyesters and polyamides.

7. The apparatus of claim 4, wherein said pore size is at most 0.5 µm.

8. The apparatus of claim 7, wherein said pore size is at most 0.1 µm.

9. A method of treating waste water, comprising:

passing a waste water through the apparatus of claim 1, wherein the sludge in the complete oxidation tank has a soluble-BOD sludge load of at most 0.1 kg/BOD/kg-MLSS·day.

10. The method of claim 9, wherein the amount of carrier in the aeration tank ranges from 5 to 50% of the tank volume.

* * * * *